July 31, 1923.
C. ANDREWS, JR
1,463,541
HANDLE FOR TOASTERS AND THE LIKE
Filed Sept. 10, 1921
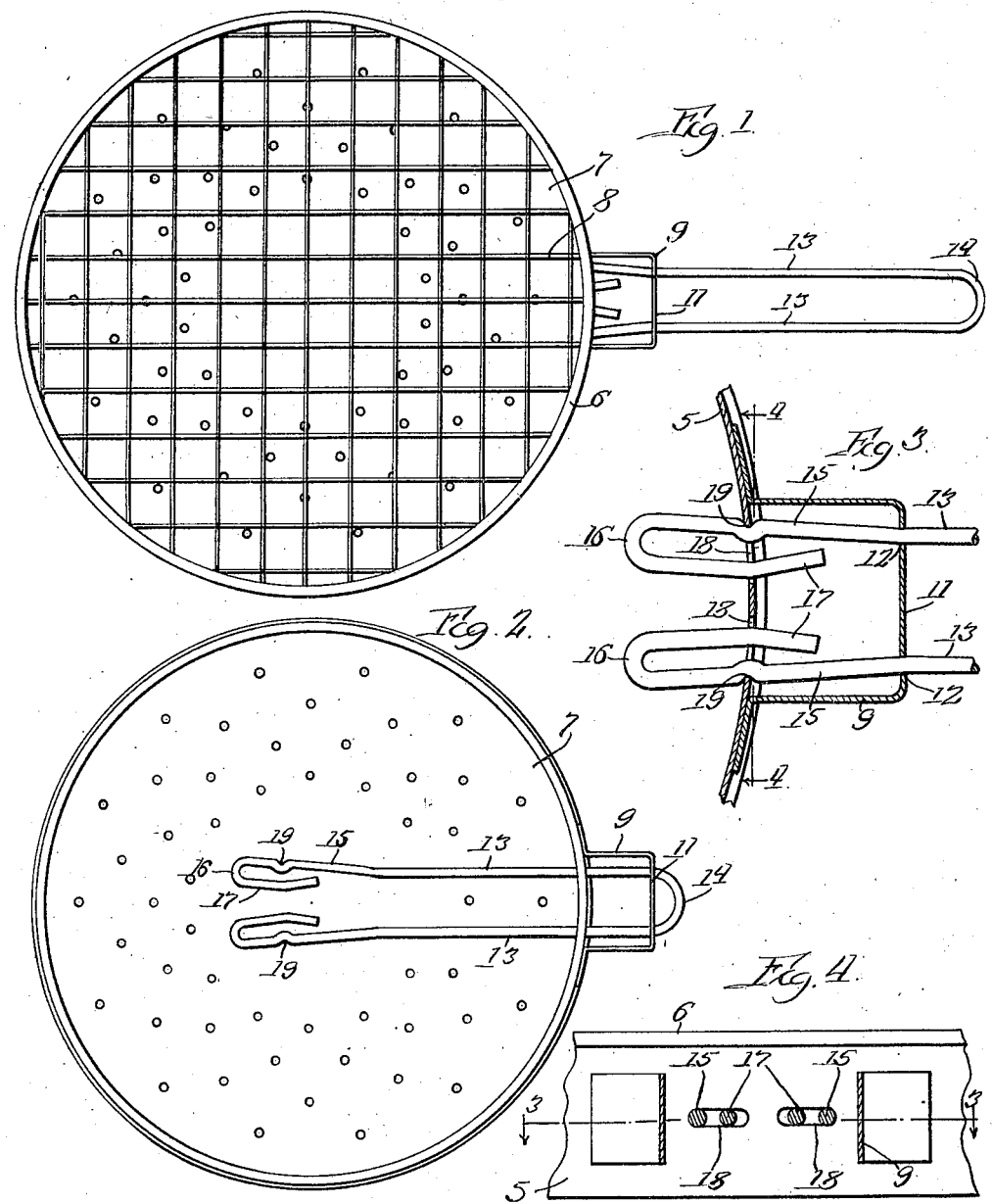

Patented July 31, 1923.

1,463,541

UNITED STATES PATENT OFFICE.

CHARLES ANDREWS, JR., OF ROCKFORD, ILLINOIS, ASSIGNOR, BY MESNE ASSIGNMENTS, TO THE WASHBURN COMPANY, OF WORCESTER, MASSACHUSETTS, A CORPORATION OF MASSACHUSETTS.

HANDLE FOR TOASTERS AND THE LIKE.

Application filed September 10, 1921. Serial No. 499,685.

*To all whom it may concern:*

Be it known that I, CHARLES ANDREWS, Jr., a citizen of the United States, residing at Rockford, in the county of Winnebago and State of Illinois, have invented certain new and useful Improvements in Handles for Toasters and the like, of which the following is a specification.

This invention pertains in general to the construction of handles especially adapted for wire and sheet metal kitchen utensils and the like, and especially for toasters. The present illustration of my invention is in connection with a toaster of the type having a flat toast-supporting top, the toaster proper being held and moved about by a handle.

The primary object of the invention is to provide a handle structure of novel design making it particularly advantageous for use in connection with kitchen utensils of various kinds and especially for toasters.

Another object is to provide a handle structure designed to promote a saving in the manufacture of various articles and in the shipping or boxing of such articles; and also to promote convenience in the handling of the articles in use.

I have also aimed to provide in a toaster, a handle construction embodying novel features which make the handle especially durable and practicable for the purposes intended.

In furtherance of these general objects, I have provided, generally stated, a handle made of relatively heavy gauge wire and so shaped and associated with the toast-supporting body as to be slidable lengthwise thereon from an inoperative position in which the major length of the handle is confined within the rim of said body, to an extended or operative position in which the handle will be automatically locked.

Other objects and attendant advantages will be appreciated by those familiar with this art as the invention becomes better understood by reference to the following description when considered in connection with the accompanying drawings, in which—

Figure 1 is a top view of a toaster embodying my invention;

Fig. 2, a bottom view of the toaster showing the handle pushed into inoperative position.

Fig. 3, a sectional view taken substantially on the line 3—3 of Fig. 4; and

Fig. 4, a sectional view taken substantially on the line 4—4 of Fig. 3.

The toast-supporting body may be of any suitable or preferred construction, and in the present example I have shown merely for purpose of illustration a circular body or structure. This comprises an annular vertical rim 5, the upper end 6 of which is crimped or clamped upon a perforated plate 7 and a crossed wire top 8.

To one side of the rim 5 is secured by any suitable means a handle brace 9 having an end 11 spaced outwardly from the rim. Said end 11 has holes 12 for the reception of the spaced members 13 of a wire handle. This handle is formed of a single strip of relatively heavy gauge wire bent medially upon itself at 14, providing the spaced, substantially parallel members 13, the ends of which are turned outwardly providing diverging portions 15 which are turned back upon themselves at 16 so that the ends 17 are disposed between and spaced inwardly from the portions 15. The diverging portion 15 and end 17 of each side member 13 of the handle is disposed in an elongated opening 18 in the rim 5. Each diverging portion 15 has a notch 19 formed in its outer side, as for example by indenting the wire.

It will be manifest from the foregoing that the handle may be moved lengthwise in the openings 12 and 18 from the inner or inoperative position shown in Fig. 2, to the outer or operative position shown in Figs. 1 and 3. The holes 12 and 18 are so located that during this movement the side members 13 will be held in substantially parallel relation, and when the diverging portions 15 reach the holes 18 they will be crowded or sprung inwardly. This puts the arms under tension, the ends having an outward pressure against the outer ends of the slot 18, so that when the notches 19 reach the rim 5, a spring snap engagement will be effected by the notches engaging the rim at the outer ends of the holes 18. Thus the handle will be automatically locked in operative position upon being moved thereto. In this position, the hande is supported at longitudinally spaced points by the rim 5 and the brace 9, and it will be particularly observed that the inner ends 17 by engagement in the holes 18 function to further brace the handle. These ends prevent twisting or torsional movement of the individual side members and thereby function very effectively in maintaining the handle in rigid relation to the toast-supporting body and against twisting movement. To return the handle to its inner position, the inner ends may be pressed together to withdraw the notches 19 from the rim 5, thereby permitting the handle to be freely pressed in.

It will be observed that a unitary and complete article is provided ready for service at all times; that the handle may be moved from its extended position into compact relation to the toaster proper, thus permitting crating or boxing in a package of minimum dimensions; that when putting the article into use all the parts are intact and no tool or extraneous parts are required, it only being necessary to pull the handle out until the side members snap into the locking position; and that the handle when in this operative position is very firmly and rigidly supported in relation to the article proper.

It is believed that the foregoing conveys a clear understanding of the objects prefaced above, and while I have illustrated but a single embodiment, it should be understood that changes might be made in details of construction without departing from the spirit and scope of the invention as expressed in the appended claims:

I claim:

1. The combination of an article having an inner and an outer wall, a handle formed of a single piece of wire bent upon itself providing spaced handle members, said inner and outer walls having registering holes for the reception of said handle members whereby the handle may be slid lengthwise in said holes to and from an inner and an outer position, the inner ends of said side members being diverged inwardly and each having a notch in its outer side, said diverging ends adapted to bear against the holes in the inner wall with increasing pressure when the handle is moved to its outer position and said notches adapted to engage in connection with the inner wall for holding the handle in said outer position.

2. A handle-equipped article, the handle of which is formed of a single piece of wire bent upon itself providing spaced side members in substantially parallel relation, means slidably supporting said side members on the article so that the handle may be slid from an inner to an outer position, means for effecting spring-snap engagement of the side members in the outer position upon movement of said members thereto, and means for holding each side member against torsional movement when in the outer position.

3. A handle structure comprising in combination with an article having an inner and an outer handle-supporting wall, a handle formed of a single piece of wire bent upon itself providing spaced side members, said inner and outer walls having holes for the reception of said side members, whereby the handle may be slid back and forth to and from inner and outer positions, the ends of said side members being turned back upon themselves and adapted to enter the holes in the inner wall member when the handle is moved to its outer position for holding the handle against twisting.

4. A handle structure comprising in combination with an article to be supported, a handle having spring wire members mounted to slide lengthwise on said article to and from inner and outer positions, the inner ends of said wire members being turned laterally and adapted to engage with the article when in the outer position for holding the respective wire members against twisting, said wire members being shaped for bearing against the article with increasing pressure when moved to said outer position and being further shaped to releasably engage with said article for holding the handle against displacement from said position.

5. A handle structure comprising in combination with an article having an inner and an outer handle supporting wall, a handle including a wire member slidable lengthwise on said walls to and from inner and outer positions, said wire member bearing against the inner wall with increasing pressure when moved to the outer position and having a laterally turned portion which co-operates with the article and prevents twisting of said member, and also having a notch co-operating with the article for preventing lengthwise displacement of said member when in the outer position.

6. In combination with an article to be supported, a handle having spaced members slidable lengthwise on the article to and from inner and outer positions, said members bearing with increasing pressure against the article when moved to the outer position, and said members having laterally turned portions co-operating with the article for preventing twisting of the respective members and being shaped to interfit with the article when in the outer position only for preventing lengthwise displacement of the handle from such position.

CHARLES ANDREWS, Jr.